Nov. 1, 1966 G. R. VAUGHAN 3,283,260
AUTOMATIC PHASE CONTROL LOOP WITHOUT FALSE
LOCKS DUE TO HARMONICS
Filed June 30, 1965 2 Sheets-Sheet 1

George R. Vaughan,
INVENTOR.
BY Harry M. Saragovitz,
Edward J. Kelly,
Herbert Berl &
Aubrey J. Dunn
ATTORNEYS George R. Vaughan,
INVENTOR.
BY Harry M. Saragovitz,
Edward J. Kelly,
Herbert Berl &
Aubrey J. Dunn
ATTORNEYS

United States Patent Office 3,283,260
Patented Nov. 1, 1966

3,283,260

AUTOMATIC PHASE CONTROL LOOP WITHOUT FALSE LOCKS DUE TO HARMONICS

George R. Vaughan, Linthicum, Md., assignor, by mesne assignments, to the United States of America as represented by the Secretary of the Army Filed June 30, 1965, Ser. No. 468,648
2 Claims. (Cl. 331—2)

This invention relates to the automatic phase locking of a plurality of oscillators in an electromagnetic spectrum generator.

There exist radar applications which demand unique local oscillator and transmitter signals. The usual transmitted signal assumes the form of a pulsed, single frequency. The receiver local oscillator, in turn, is a continuous, single frequency, offset in frequency from the transmitted energy by a convenient intermediate frequency.

There are advantages, in some instances, in transmitting a spectrum of phase locked frequencies and mixing the return with a local oscillator output consisting of a spectrum of phase locked frequencies.

The present invention deals with the problem of generating the transmitter and receiver spectrums.

An object of the invention is to provide a means for accurately maintaining phase lock between a plurality of frequencies in a spectrum generator.

Another object of the invention is to provide the above means with little changes in existing equipment and consequent small cost.

The objects of the invention are fulfilled by changing the response curve of an IF amplifier in the spectrum generator so that certain frequencies, which might cause false phase locks, are amplified much less than the desired intermediate frequency. Additionally, the mixer of the generator which feeds the IF amplifier has its inputs adjusted, in accordance with the invention, to cause reduction of another cause of false phase lock.

Figure 1:
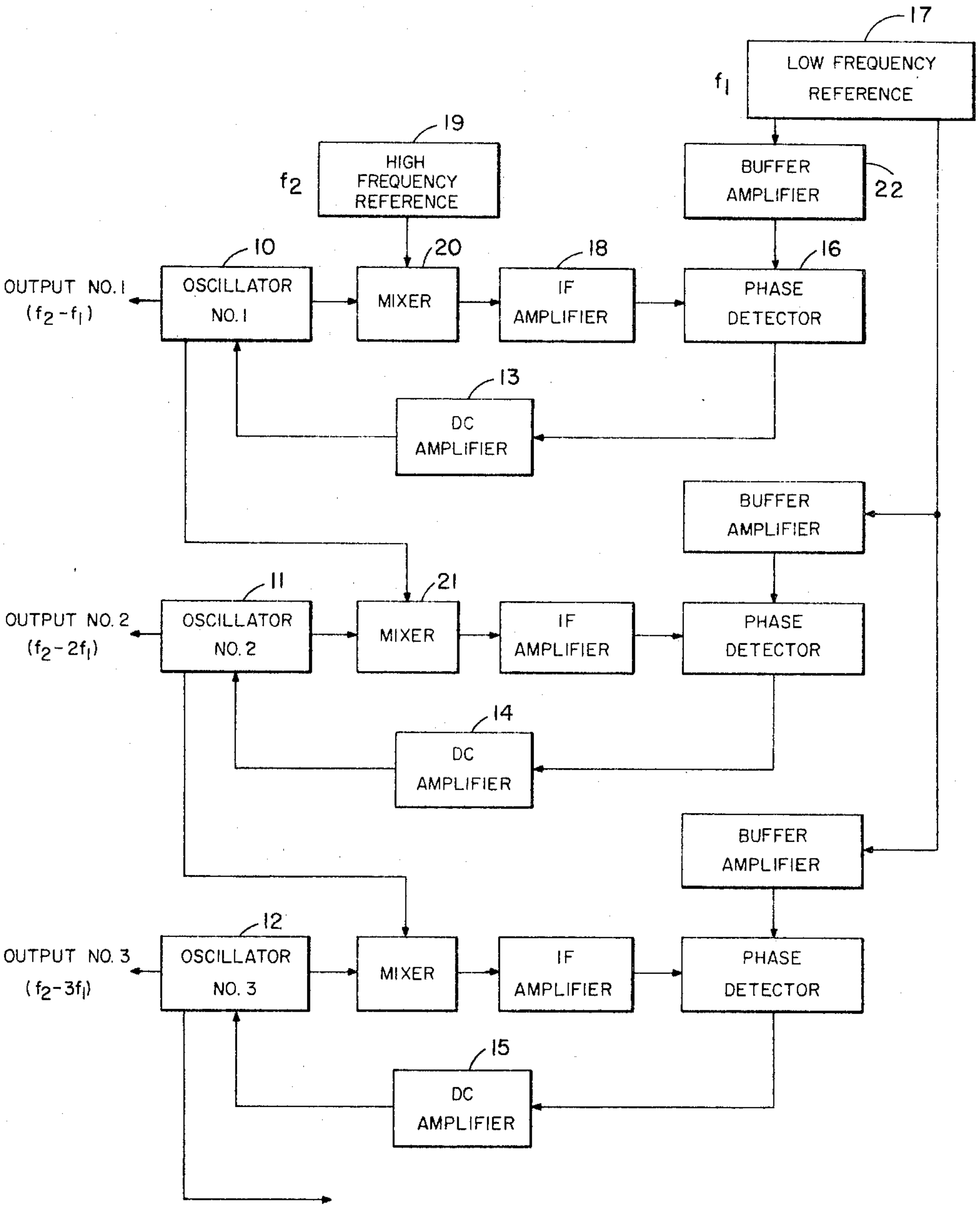
Figure 2:
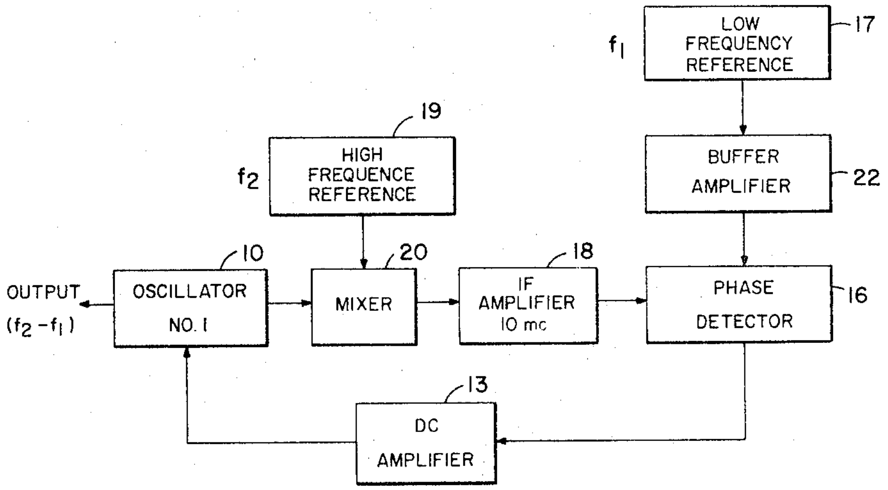
Figure 4:
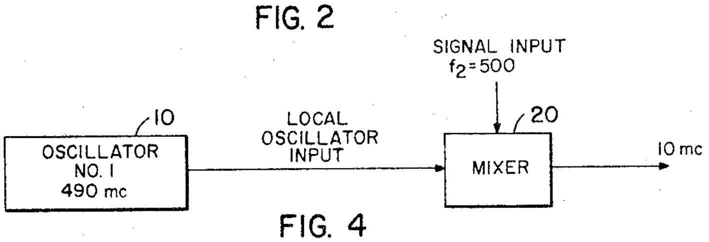
Figure 3:
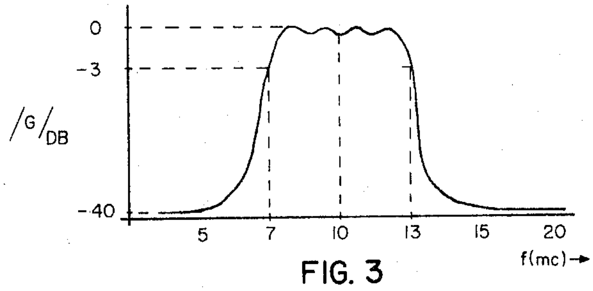
Figure 5:
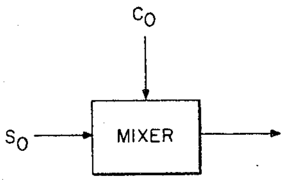
Figure 6:
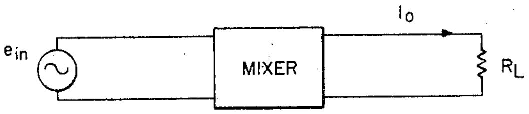

The invention may be best understood by reference to the drawings, in which:

FIGURE 1 shows an arrangement for generating a spectrum of frequencies and wherein each frequency is separated from its neighbor by a discrete frequency and accurately phase locked to it, FIGURE 2 shows the arrangement for a single output of the spectrum generator of FIGURE 1, FIGURE 3 shows the response curve of the IF amplifier of FIGURE 2 as adjusted in accordance with the invention, FIGURE 4 shows specific examples of inputs to, and output of, the mixer of FIGURE 2, FIGURE 5 shows a general representation of the FIGURE 2 mixer, and FIGURE 6 shows another general representation of the FIGURE 2 mixer.

In FIGURE 1, there is shown a chain of three oscillators 10, 11 and 12 which it is desired to phase lock. This may be accomplished as by the invention as described below. Each oscillator is frequency controlled by a respective D.C. amplifier 13, 14 or 15. The input to a D.C. amplifier such as 13 is the output of a phase detector 16, which detects the phase difference between a low frequency reference 17 and the output of an IF amplifier 18. The IF of 18 is the difference between a high frequency reference 19 and the output of the oscillator No. 1 (10), for the topmost mixer 20, and difference between the frequency of the oscillator No. 1 (10) and oscillator No. 2 (11) is for the middle mixer 21 of FIGURE 1, etc. A buffer amplifier such as 22 may be used between the low frequency reference 117 and each phase detector such as 16.

The chain of phase locked oscillators as shown in FIGURE 1 can be extended to include (within reason) an arbitrary number of frequencies. There are definite problems lurking in the individual phase loops that can reduce the system to a tangle of related faults unless carefully considered.

The arrangement shown in FIGURE 2 forces oscillator No. 1 to oscillate at a frequency $(f_2-f_1)$ [$(f_2+f_1)$ is another possibility] and phase locked to $f_2$. Qualitatively, the operation becomes clear if numbers are assigned. Let $f_2=500$ mc., $f_1=10$ mc. and when phase locked the frequency of oscillator No. 1 is 490 mc. Let us assume the system is phase locked and start at oscillator No. 1 and trace around the loop. The 490 mc. is mixed in mixer 20 with 500 mc. yielding a 10 mc. difference frequency which in turn is amplified by the 10 mc. IF strip 18 and compared in phase to the 10 mc. reference ($f_1$) in the phase detector 16. The resulting D.C. is amplified by D.C. amplifier 13 which in turn controls the oscillator frequency. Unfortunately, the system can also phase lock when oscillator No. 1 is separated by 5 mc. from the reference $f_2$. Obviously, these modes of operation ruin the line spacing in the generated spectrum. The 5 and 20 mc. "locks" are called "false lock." The obvious cure for the 20 mc. lock and one cause of the 5 mc. lock is to simply shape the IF amplifier response such that the IF gain at 5 and 20 mc. (and resulting loop gain) is down about 40 db. It is not difficult to design the IF response as shown in FIGURE 3, and eliminate the 20 mc. lock and one cause of 5 mc. locks. However, there is a second source of 5 mc. locks that is more illusive and will not yield to the measures described. This invention is concerned with this fault.

Referring to FIGURE 4, assume that oscillator No. 1 is tuned to (or sweep thru) 495 mc. and the mixer output is 5 mc. (as described earlier). If the second harmonic of 5 mc. or 10 mc. is of sufficient magnitude, IF strip 18 most certainly will respond (IF strip 18 cannot distinguish a true 10 mc. input from the second harmonic of 5 mc.) and phase locking will occur. The level of the second harmonic of 5 mc. is usually much less than the fundamental of the true 10 mc. difference; however, the loop gain is sufficient to achieve phase lock at reduced 10 mc. levels. The standard procedure is to drive mixer 20 with a 10 to 1 ratio of local oscillator power to signal power. Thus, the mixer output retains the signal input characteristics diminished by the conversion efficiency. However, in this mode of operation, the second harmonic of 5 mc. still yield false locks. This mathematical description of FIGURE 5 clearly exposes the problem and suggests the solution.

Referring to FIGURE 6, the characteristics of mixer 20, a non-linear device, may be represented by four terms of a power series as follows:

$$i_o=a_1e_{in}+a_2e_{in}^2+a_3e_{in}^3+a_4e_{in}^4+\dots$$

Let $e_{in}$ assume the form of two signals $$C+S=C_o\cos c+S_o\cos s$$

The angles $c$ and $s$ are considered to be the same frequency. When this input function is substituted into four terms of the power series, the following results:

$$V=a_0+a_1(C+S)+a_2(C+S)^2+a_3(C+S)^3+a_4(C+S)^4$$

The terms of the power series have been expanded and the resulting frequencies and coefficients tabulated. For example, the coefficient and frequencies of the side band pair $(c-s)$ and $(c+s)$ is as follows:

coefficients $$v=a_2c_os_o+\frac{3a_4c_o^3s_o}{2}+\frac{3a_4c_os_o^3}{2}+3a_4c_os_o$$

$$\cos(c+s)+\cos(c-s)$$

frequencies

This is not suprprising; however, among other frequencies we have present the frequency $2(c-s)$ with its coefficient $3a_4s_o^2c_o^2/4$.

Let $c=500$ mc. (FIGURE 5) and $s=495$ mc. The 5 mc. mixer output level is a function of $$a_2c_os_o+\frac{3a_4c_o^3s_o}{2}+\frac{3a_4c_os_o^3}{2}+3a_4c_os_o$$

the 10 mc. output level is a function of $3a_4s_o^2c_o^2/4$. This latter term will yield a false lock if of suffiicent strength. To eliminate the latter term, one solution is to operate the mixer square law retaining only the first two terms in the power series, $i_o=a_1e_{in}+a_2e_{in}^2$. Clearly, as $a_4$ approaches zero so does the term $3a_4s_o^2c_o^2/4$, and the remaining source of false locks follows.

This involves biasing the crystals if crystal balanced strip line mixers are used. This scheme will work; however, the bias current levels are critical (the current levels are different for each crystal although the crystals are advertised as matched pairs) and the dynamic crystal impedance is a function of bias current. Thus, the problem of retaining the proper impedance match and balance in the strip line balanced mixer when operating square law is not any easy task.

If we reexamine the mixer output as a function of mixer inputs, a more effective solution is evident. The $(c-s)$ frequency output has the coefficient $$a_2c_os_o+\frac{3a_4c_o^3s_o}{2}+\frac{3a_4c_os_o^3}{2}+3a_4c_os_o$$

while the $2(c-s)$ frequency (the false lock frequency) retains the coefficient $3a_4s_o^2c_o^2/4$. The power of the $(c-s)$ frequently is approximately proportional to C (the signal input to the balanced mixer) raised to the first power, while the power of the $2(c-s)$ frequency is a function of $C_o$ squared. Therefore, if we reduced the magnitude of $C_o$ into the mixer by a factor of 10, we reduce the power of the $(c-s)$ output frequency by 10 but the $2(c-s)$ power is reduced by 100. Therefore, if we allow the ratio of mixer inputs $s_o/c_o$ to assume a value of 100 instead of 10, we diminish the power of the $2(c-s)$ term compared to the $(c-s)$ term by a factor of 10.

The argument may be raised that the loop gain will be diminished since $(c-s)$ is reduced by 20 db. However, this gain is easily recovered in the IF strip where excess gain is available. In a transistor IF strip the number of stages is determined primarily by the skirt selectivity (a function of the number of tuned circuits). If designed properly, the equivalent stable gain bandwidth available per stage is in excess of that needed.

Of course, the $2(c-s)$ term will be amplified by the additional 20 db of IF gain, but the generation of the $2(c-s)$ frequency was diminished by 40 db. This arrangement retains the original loop gain but attenuates the source of false locks by 20 db which is sufficient to reliably prevent false locks.

This arrangement requires no additional hardware to prevent false locks but rather a more efficient use of existing circuitry.

While a specific embodiment of the invention has been disclosed, variations may be made in the frequencies employed or in the circuit elements used without departing from the invention. For example, a different IF would be used from that disclosed. Also, vacuum tube or other types of amplifiers could be used in place of the transistor amplifiers mentioned.

I claim:

1. A phase locked spectrum generator comprising a first oscillator having a first frequency output, a second oscillator having a second frequency output, a third oscillator having a control input and a third frequency output, wherein said third frequency is the difference between said first and second frequencies, a mixer having plural inputs and an ouput and with said second and third oscillators connected to inputs of said mixer, the output of said mixer being the difference between said second and third frequencies and equal to said first frequency, said mixer output being connected to an intermediate amplifier having an output, said intermediate amplifier output and said first oscillator output being connected to a phase detector having an output, connecting means between said phase detector output and the control input of said third oscillator, a fourth oscillator having a control input and a fourth frequency output, an additional mixer means having plural inputs and an output, said third and fourth oscillators being connected to inputs of said additional mixer, the output of said mixer being the difference between said third and fourth frequencies and equal to said first frequency, said additional mixer output being connected to an additional intermediate amplifier having an output, said additional intermediate frequency amplifier output and said first oscillator output being connected to an additional phase detector having an output connected to an additional connecting means, said additional connecting means being also connected to the control input of said fourth oscillator.

2. The generator as defined in claim 1 wherein the ratio of amplitudes of the frequency outputs of said fourth and third oscillators connected to the inputs of said additional mixer is 100 to 1.

References Cited by the Examiner

UNITED STATES PATENTS

| | | | |
|---|---|---|---|
| 2,786,140 | 3/1957 | Lewis | 331—2 |
| 2,917,713 | 12/1959 | Grauling | 331—22 |
| 2,987,680 | 6/1961 | Israel | 331—2 |

OTHER REFERENCES

Terman Radio Engineers' Handbook, 1943, McGraw-Hill Book Co., pp. 568, 569.

ROY LAKE, *Primary Examiner.*

JOHN KOMINSKI, *Assistant Examiner.*